United States Patent
Wang et al.

[11] Patent Number: 5,974,079
[45] Date of Patent: Oct. 26, 1999

[54] METHOD AND APPARATUS FOR ENCODING RATE DETERMINATION IN A COMMUNICATION SYSTEM

[75] Inventors: Michael M. Wang, Carpentersville; Tyler Brown; William Morgan, both of Palatine, all of Ill.

[73] Assignee: Motorola, Inc., Schaumburg, Ill.

[21] Appl. No.: 09/013,421

[22] Filed: Jan. 26, 1998

[51] Int. Cl.⁶ .......................... H04B 15/00; H04B 7/216
[52] U.S. Cl. ............................. 375/200; 370/342
[58] Field of Search .................... 375/200, 206, 375/340, 341, 347; 370/341, 347, 342

[56] References Cited

U.S. PATENT DOCUMENTS

| | | | |
|---|---|---|---|
| 5,418,795 | 5/1995 | Itakura et al. | 371/30 |
| 5,767,738 | 6/1998 | Brown et al. | 329/304 |
| 5,790,515 | 8/1998 | Lipa et al. | 370/209 |
| 5,796,757 | 8/1998 | Czaja et al. | 371/46 |
| 5,862,190 | 1/1999 | Schaffner | 375/341 |
| 5,878,098 | 3/1999 | Wang et al. | 375/377 |

*Primary Examiner*—Chi H. Pham
*Assistant Examiner*—Khai Tran
*Attorney, Agent, or Firm*—Sayed Hossain Beladi

[57] ABSTRACT

A method and apparatus of determining an encoding rate associated with a received signal (12), where the method including the steps of demodulating in a demodulator (80) to produce a series of metrics (22) representing energies of a series of data symbols carried by received signal (12); decoding in a decoder (20) series of metrics (22) to produce a set of total metrics (TM) (90) corresponding to a set of possible encoding rates; normalizing in a TM normalizer (28) set of TM (90) to produce a corresponding set of normalized TM (23); and determining the encoding rate in a rate determination (24) based on set of normalized TM (23). The normalizing step in TM normalizer (28) includes multiplying a set of effective finger counts (19) by a constant (410) to generate a corresponding set of numbers (420); and subtracting numbers (420) from associating TM (90) to produce normalized TM (23).

16 Claims, 3 Drawing Sheets

METHOD AND APPARATUS FOR ENCODING RATE DETERMINATION IN A COMMUNICATION SYSTEM

FIELD OF THE INVENTION

The present invention relates generally to communications, and more particularly to a method and apparatus for determining encoding rate in a communication system.

BACKGROUND OF THE INVENTION

In certain communication systems, such as in a code division multiple access (CDMA) cellular system as defined by interim specification (IS) IS-95, a receiver in the communication system determines an estimated encoding rate for each received frame. In such systems, the accuracy of the estimated encoding rate affects speech quality since any rate determination error typically causes annoying artifacts in the decoded speech signal.

In prior arts, several methods of determining estimated encoding rate have traditionally been proposed. However, when the estimated encoding rate is based on a calculated total metric information of the received frame, the estimated encoding rate very often is inaccurate and inconsistent. A calculated total metric information of a received frame may be biased by an unknown amount. The amount of bias is unknown because the environments through which the signal has propagated, demodulated and decoded have varying and unpredictable effects on the total metric information. As a result, the estimated encoding rate based on a biased total metric information becomes to some degree inaccurate and inconsistent. Inaccuracy and inconsistency in the estimated encoding rate cause annoying artifacts in the decoded speech signal.

Accordingly, there exists a need for an improved apparatus and method for performing rate determination in a communication system.

SUMMARY OF THE INVENTION

In order to address this need as well as others, the present invention provides a method and apparatus of determining an encoding rate associated with a received signal. The method includes the steps of demodulating the received signal to produce a series of metrics representing energies of a series of data symbols carried by the received signal; decoding the series of metrics to produce a set of total metrics corresponding to a set of possible encoding rates; normalizing the set of total metrics to produce a corresponding set of normalized total metrics; and determining the encoding rate based on the set of normalized total metrics. The set of total metrics is normalized according to a set effective finger counts which are generated based on the demodulation step. The normalizing step includes multiplying the set of effective finger counts by a constant to generate a corresponding set of numbers; and subtracting the set of numbers correspondingly from the set of total metrics to produce the set of normalized total metric.

The invention itself, together with its attendant advantages, may be best understood by reference to the following detailed description, taken in conjunction with the accompanying drawings.

DETAILED DESCRIPTION OF THE PREFERRED EMBODIMENT(S)

Figure 1:
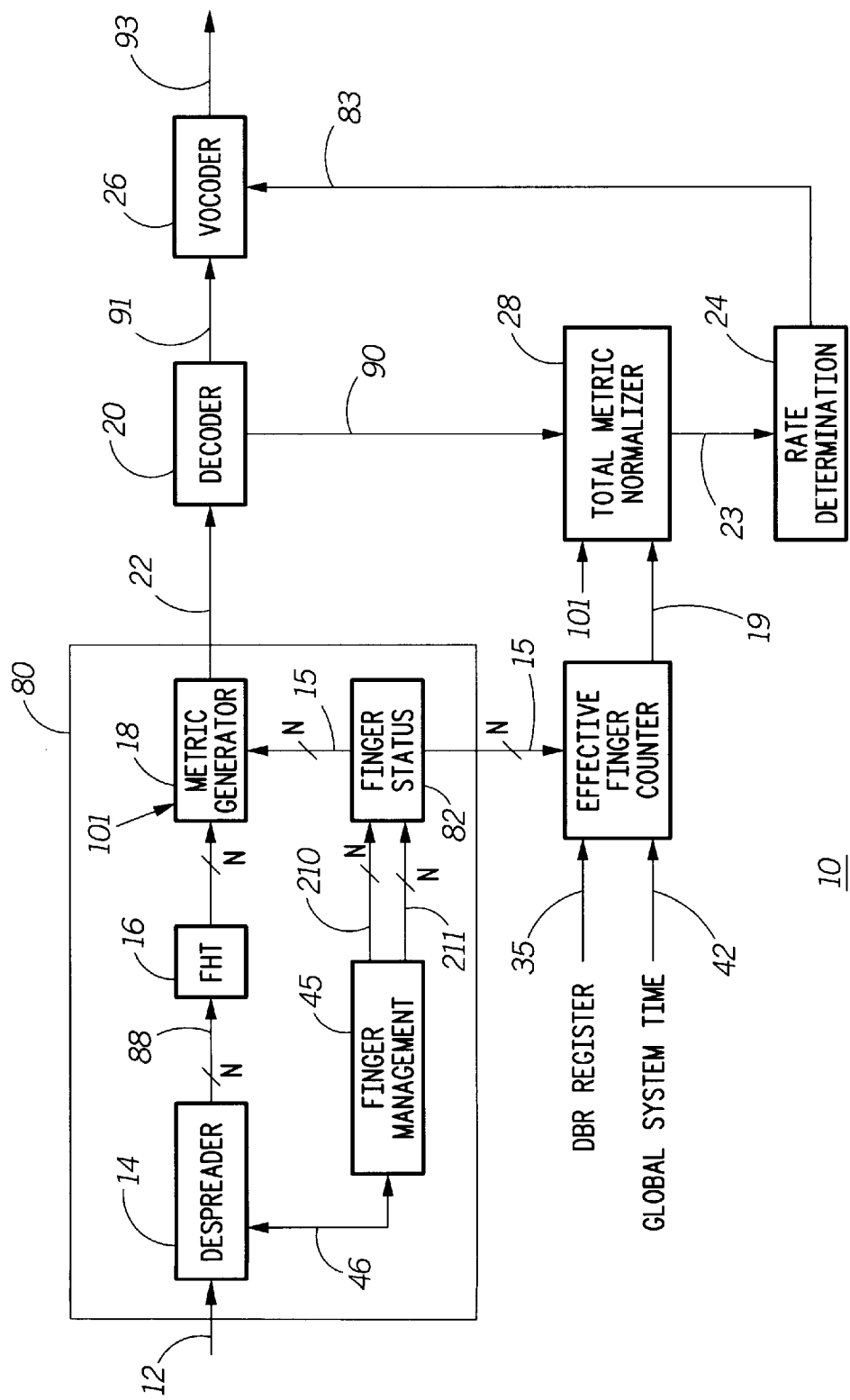
FIG. 1 is a block diagram of a receiver according to an embodiment of the present invention.

Referring to FIG. 1, a block diagram of a receiver 10 of a communication system is illustrated. The receiver 10 may be a base station receiver such as a receiver in a Motorola SC9600™ base station or may be a receiver in a mobile unit, such as in a conventional code division multiple access (CDMA) cellular phone. The receiver 10 includes a demodulator 80, a decoder 20, a rate determination module 24, a vocoder 26, a total metric normalizer 28, and an effective finger counter generator 17. During operation of the receiver 10, demodulator 80 receives a signal 12 which is normally at baseband frequencies, however, the operations of receiver 10 and demodulator 80 are not limited to receiving baseband signals. During the demodulation process, demodulator 80 determines a metric 22 for every data symbol in signal 12. Decoder 20 receives metric 22 for decoding operation. Decoder 20 may be of a convolutional decoder type for implementation according to IS-95 standard. As such, decoder 20 may be a Viterbi decoder as commonly known in the prior art, or a conditional decoder as provided in U.S. patent application Ser. No. 08/581,696 entitled "Method and Apparatus for Decoding an Encoded Signal", attorney docket number CE2924R by Schaffner, filed Dec. 29, 1995 which is incorporated by reference herein. In any case, decoder 20, after receiving a metric 22 for every symbol in a CDMA frame, communicates a total metric 90 to total metric normalizer 28, and decoded signal 91 to vocoder 26.

Total metric 90 may become biased by an unknown magnitude for a variety of reasons. Among them, continuously changing communication system propagation environment, and operations of demodulator 80 and decoder 20 are notable. To eliminate the bias from total metric information 90, total metric 90 is normalized in total metric normalizer 28. As a result, total metric normalizer 28 produces a normalized total metric 23. Normalized total metric 23 is fed to rate determination 24 to be used for producing an estimated encoding rate 83. Operation of rate determination 24 is according to known prior art. As such, rate determination 24 may be as provided in U.S. patent application Ser. No. 08/672,155 entitled "Method and Apparatus for Rate Determination in a Communication System", attorney docket number CE3142R by Wang et al, filed Jun. 27, 1996 which is incorporated by reference herein.

According to the present invention, estimated encoding rate 83 is based on normalized total metric 23 which is free of any biased information; therefore, it has a greater accuracy and consistency than estimates based on unnormalized total metric 90. Vocoder 26 outputs a speech signal 93 based on decoded signal 91 and estimated encoding rate 83; as a result, speech signal 93 is clear and free of annoying artifacts.

Decoder 20 produces total metric 90 based on metric 22 of all data symbols in a CDMA frame carried by signal 12. To generate metric 22 for a data symbol, demodulator 80 includes a despreader module 14, a fast hadamard transform (FHT) module 16, a metric generator 18, a finger management block 45, and a finger status 82. Despreader 14 despreads signal 12 to produce output 88. Despreader 14 normally employs RAKE fingers to provide output 88. The number of signals in output 88, therefore, corresponds to a number of RAKE fingers employed in despreader 14. All signals in output 88 differently are representing despreaded forms of signal 12. Each finger provides a signal representing a despreaded form of signal 12. Among other differences, a time offset difference among RAKE fingers employed in despreader 14 accords a difference between the signals in output 88. Normally, despreader 14 has 3–4 fingers.

FHT 16 transforms output 88 to produce a transformed output 30. Output 30 has a number of transformed signals. The number of signals corresponds to the number of signals in output 88. Metric generator 18 receives output 30 to produce metric 22 for every data symbol in a frame. To produce metric 22, metric generator 18 also takes into account a demodulation type indicated by a demodulation type control 101, and a finger status information provided by finger-status 15.

Although a demodulation mode control generator for generating control 101 is not shown, one may be incorporated in receiver 10 according to prior art. Such a demodulation mode control generator is provided in U.S. patent application Ser. No. 08/734,225 entitled "Method and Apparatus for Demodulating a Modulated Signal", attorney docket number CE3166R by Brown et al, filed Oct. 21, 1996 which is incorporated by reference herein. Normally, there are coherent and noncoherent demodulation types. Other demodulation types may be included and controlled accordingly.

To generate finger-status 15, finger status 82 receives a finger lock status 210, and a preliminary combine status 211 from finger management block 45. Finger management 45 produces finger lock status 210 and preliminary combine status 211 about each finger employed in despreader 14 while communicating and controlling despreader 14 through an interface 46. Operations of despreader 14 and finger management 45 to produce finger lock status 210 and preliminary combine status 211 are commonly known in prior art. For example, a typical finger management 45 monitors each finger energy output during each power control group (PCG) of a CDMA frame, and accordingly determines which finger is in lock status during a PCG timing. Moreover, finger management 45 determines which finger output signal is a candidate for combining with output signals of other fingers based on a comparison of the signal energy output with a predetermined threshold energy. Accordingly, finger management 45 produces lock status 210 and preliminary combine status 211 information about each finger during each PCG timing in a CDMA frame.

A CDMA frame, according to IS-95 standard, includes sixteen power control groups (PCG). Accordingly, each finger for each CDMA frame would have a series of sixteen lock status 210, and a series of sixteen preliminary combine status 211 information. For example, preliminary combine status 211 is indicated by logical value "1" during a PCG timing when a finger output signal meets the minimum output energy. As such, the signal is a possible candidate during such PCG timing in the CDMA frame for final combining operation performed by metric generator 18. A logical value "0" is generated if the output signal energy is below the minimum threshold requirement. For logical compatibility, finger lock status 210 of a finger indicates a lock status for each PCG timing by logical value "1", and an unlock status by logical value "0".

Figure 2:
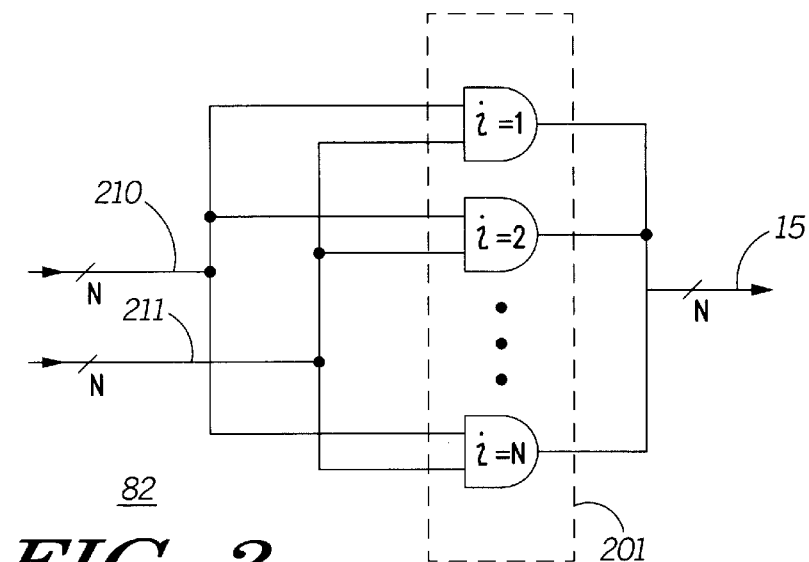
FIG. 2 is a block diagram of a finger status generator.

Referring to FIG. 2, finger status 82 generates finger-status 15 by performing logical AND function over finger lock status 210 and preliminary combine status 211. Finger status generator 82, thus, includes a bank of logical AND gates 201. The number of AND gates in 201 is at least, or logically, equal to the number of fingers in despreader 14. Each AND gate in 201 has at least two inputs for receiving lock status 210 and preliminary combine status 211 associated with a finger output signal. Finger-status 15 indicates to metric generator 18 whether a metric calculated for output signal of a finger during a PCG timing should be combined with metrics calculated for output signal of other fingers during the same PCG timing.

Referring to FIG. 1 again, to produce normalized total metric 23, total metric normalizer 28 normalizes total metric 90 according to demodulation type control 101, and an effective finger count (EFC) 19. EFC 19 includes effective finger count information for all possible encoding rates in the communication system. According to IS-95 standard, there are four possible encoding rates, namely: a first rate, e.g. full rate, a second rate, e.g. one half rate (½), a third rate, e.g. one quarter rate (¼), and a fourth rate, e.g. one eighth rate (⅛). In case of full rate, all sixteen PCGs in a CDMA frame are active. For one half rate, one quarter rate, and one eighth rate respectively eight, four, and two PCG's are active. Active PCGs in a CDMA frame for each of one half rate, one quarter rate, and one eighth rate are randomly selected according to a value in a data burst randomization (DBR) 35 register. The DBR 35 register is read to find out which PCGs in a CDMA frame are used for a given encoding rate. Since all PCGs are active for full rate, there is no need to read DBR 35 for full rate, only for the rates less than the full rate. As a result, for an implementation according to IS-95 standard, effective finger count 17 generates four effective finger counts information, for all four possible encoding rates, which all are carried by EFC 19. To coordinate read and write operations, PCG and CDMA frame timings are based on a global system timing 42.

Figure 3:
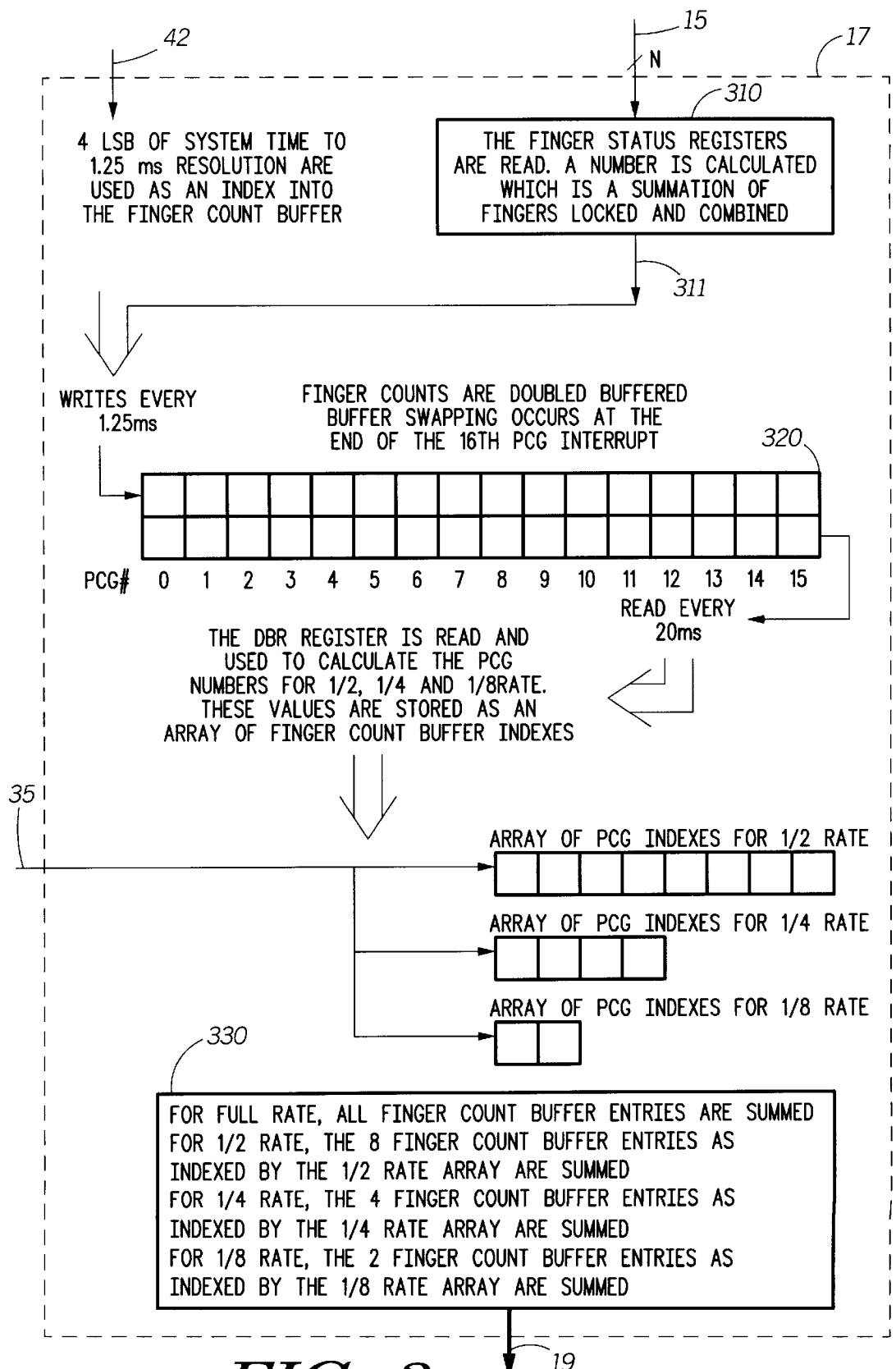
FIG. 3 is a flow chart depicting various steps of a method of generating effective finger counts according to an aspect of the present invention.

Referring to FIG. 3, effective finger counter 17 is illustrated. To generate EFC 19, the information regarding each finger status in finger-status 15 is read at 310. Each finger would have either a "1" or a "0" value for every PCG in finger-status 15. Finger-status 15 of all fingers for each PCG are summed at 310. As a result, a summed value 311 is produced for every PCG. Summed value 311, in case of four fingers system, ranges from zero to four. For example, if finger-status 15 has "0" status for every finger during a PCG, summed value 311 has a value equal to zero for that PCG. Similarly, if finger-status 15 has status "1" for every finger during a PCG, summed value 311 has a value equal to four for that PCG. Summed value 311 is written in its respective PCG in a buffer register 320 according to system timing 42. Since a CDMA frame according to IS-95 standard has 16 PCGs, buffer register 320 for an IS-95standard implementation is shown to have 16 memory locations. To continue the operation while reading summed value 311 for other frames, values in buffer register 320 may be loaded into another buffer once buffer register 320 has received all PCGs in a frame. Then, DBR register 35 is read for calculating and indexing which PCGs correspond to one half rate, one quarter rate, and one eighth rate. To calculate EFC 19 for full rate, all buffer entries in buffer register 320 are summed at 330. To calculate EFC 19 for one half rate, one quarter rate, and one eighth rate, respectively, buffer register 320 entries as indexed or identified from DBR register 35 are summed at 330. As a result, EFC 19 includes four numbers, each associated with an encoding rate. EFC 19 is then used by total metric normalizer 28 to produce normalized total metric 23.

Figure 4:
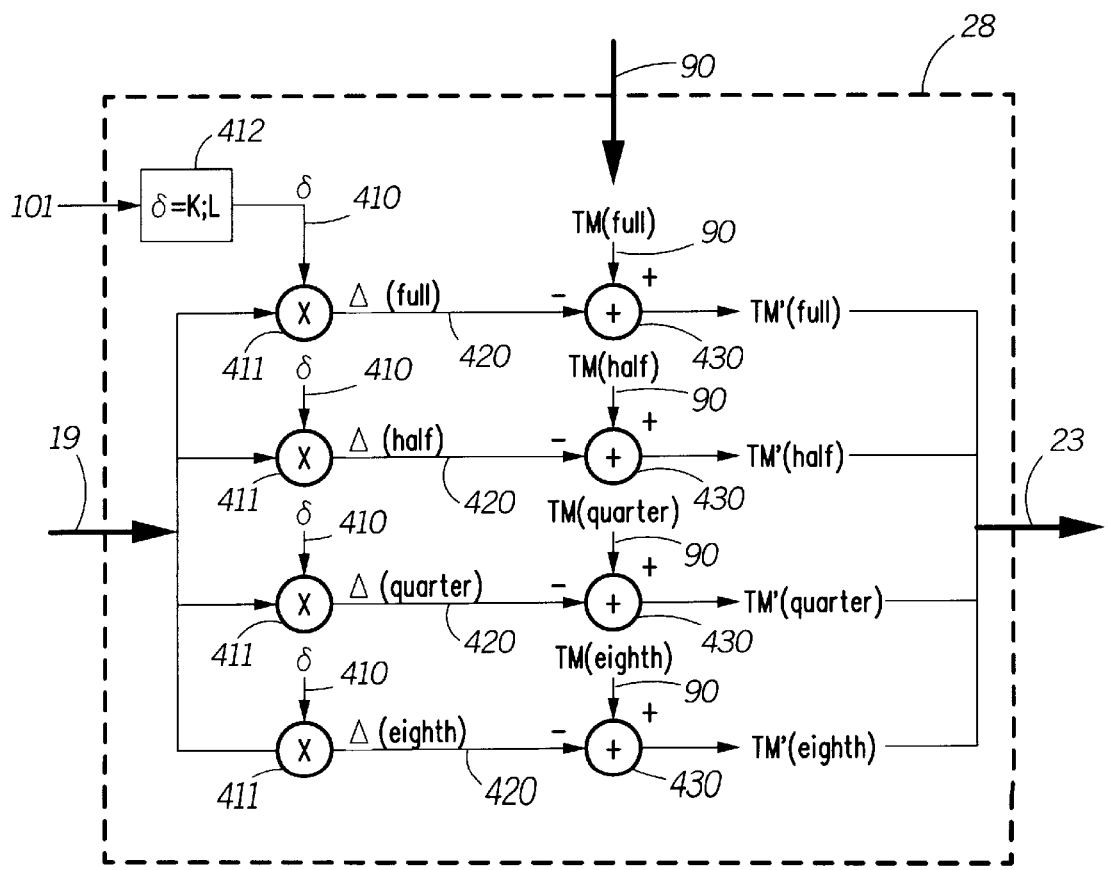
FIG. 4 is a block diagram of a total metric normalizer according to an aspect of the present invention.

Referring to FIG. 4, total metric normalizer 28 is illustrated. To normalize total metric (TM) 90 thus generating normalized total metric 23, the value of TM 90 is reduced at a summer 430 proportional to a number 420. At a multiplier 411, EFC 19 and a predetermined constant 410 are multiplied to produce number 420. Constant 410 is selected from memory 412 according to modulation type control 101. Constant 410 is normally predetermined. The value of constant 410 may be dependent on analytical or experimental analysis. For example, if coherent modulation type is selected, constant 410 is equal to 3; similarly, if non-coherent modulation type is selected, constant 410 is equal to 10. The amount and distribution of bias in total metric 90 normally vary depending on the demodulation type. Therefore, a modulation type selection is only required if various demodulation types are performed in demodulator 80.

Since there are four possible encoding rates in IS-95standard, four total metrics are included in total metric 90. Multiplication at 411 and summation at 430 are repeated for all four possible encoding rates to produce normalized total metric 23. Normalized total metric 23, therefore, includes four normalized total metrics, each corresponding to a possible encoding rate. Estimated encoding rate 83, according to the present invention, is accurate and consistent when produced based on normalized total metric 23.

Further advantages and modifications of the above described apparatus and method will readily occur to those skilled in the art. The invention, in its broader aspects, is therefore not limited to the specific details, representative apparatus, and illustrative examples shown and described above. Various modifications and variations can be made to the above specification without departing from the scope or spirit of the present invention, and it is intended that the present invention cover all such modifications and variations provided they come within the scope of the following claims and their equivalents.

What is claimed is:

1. In a communication system receiver, a method for determining, from among a set of encoding rates, an encoding rate of a received signal comprising the steps of:

demodulating said received signal to produce a series of metrics representing energies of a series of data symbols carried by said received signal, wherein said demodulating includes the steps of:

despreading said received signal to produce, according to a plurality of fingers, a plurality of despreaded signals;

generating a plurality of finger-status indicators corresponding to said plurality of fingers indicating combine status of each of said plurality of despreaded signals;

generating said series of metrics based on said plurality of despreaded signals and said plurality of finger-status indicators;

decoding said series of metrics to produce a set of total metrics corresponding to said set of encoding rates;

normalizing said set of total metrics to produce a corresponding set of normalized total metrics; and determining said encoding rate based on said set of normalized total metrics.

2. The method as recited in claim 1, wherein said generating plurality of finger-status indicators step further comprising the steps of:

receiving, corresponding to said plurality of fingers, a plurality of finger lock status and a plurality of preliminary combine status; and producing said plurality of finger-status indicators by performing logical AND function over associated said plurality of finger lock status and said plurality of preliminary combine status.

3. The method as recited in claim 1, further comprising the steps of:

generating a set of effective finger counts based on said plurality of finger-status indicators, each member of said set of effective finger counts associated with an encoding rate in said set of encoding rates; and using, in said normalizing step, members of said set of effective finger counts to normalize correspondingly members of said set of total metrics.

4. The method as recited in claim 3 wherein each of said plurality of finger-status indicators indicating combine status for each of a plurality of power control groups in a frame carried by said received signal.

5. The method as recited in claim 4 wherein said frame includes sixteen power control groups.

6. The method as recited in claim 4 wherein said determining said encoding rate is performed per said frame.

7. The method as recited in claim 4 wherein said generating effective finger count step further comprising the steps of:

summing said plurality of finger-status indicators that are corresponding to same power control group in said plurality of power control groups to produce a plurality of summed values corresponding to said plurality of power control groups; and summing said summed values to produce at least one effective finger count in said set of effective finger counts.

8. The method as recited in claim 7 further comprising the steps of:

selecting a subset of said plurality of summed values; and summing said subset of summed values to produce at least one effective finger count in said set of effective finger counts.

9. The method as recited in claim 8 wherein said subset in said selecting associated with an encoding rate in said set of encoding rates.

10. The method as recited in claim 8 wherein said selecting is according to a value of a data burst register.

11. The method as recited in claim 5 wherein said using members of said set of effective finger count step further comprising the steps of:

multiplying members of said set of effective finger counts by a constant to generate a corresponding set of numbers; and subtracting members of said set of numbers from corresponding members in said set of total metrics to produce said set of normalized total metric.

12. The method as recited in claim 11 wherein value of said constant is according to a demodulation type performed in said demodulating step.

13. The method as recited in claim 1 wherein said communication system is a code division multiple access communication system.

14. In a communication system receiver, an apparatus for determining an encoding rate comprising:

a demodulator demodulating a received signal and producing a series of metrics representing a series of data symbols carried by said received signal, wherein said demodulator includes:

a despreader despreading said received signal according to a plurality of fingers and producing a corresponding plurality of despreaded signals;

a finger status generator generating a plurality of finger-status indicators corresponding to said plurality of fingers indicating combine status of said plurality of despreaded signals;

a metric generator generating said series of metrics based on said plurality of despreaded signals and said plurality of finger-status indicators;

a decoder decoding said series of metrics and producing a total metric;

a total metric normalizer normalizing said total metric and producing a normalized total metric; and an encoding rate determinator determining said encoding rate based on said normalized total metric.

15. The apparatus as recited in claim 14, further comprising:

an effective finger counter generating based on said finger-status indicators an effective finger count to be used by said total metric normalizer to produce said normalized total metric.

16. The apparatus as recited in claim 14 wherein said decoder is a conditional decoder.

* * * * *